Dec. 7, 1971     E. L. DYRE     3,625,021
OVERLOAD CONTROL FOR ABSORBENT REFRIGERATION SYSTEM
Filed Jan. 2, 1970
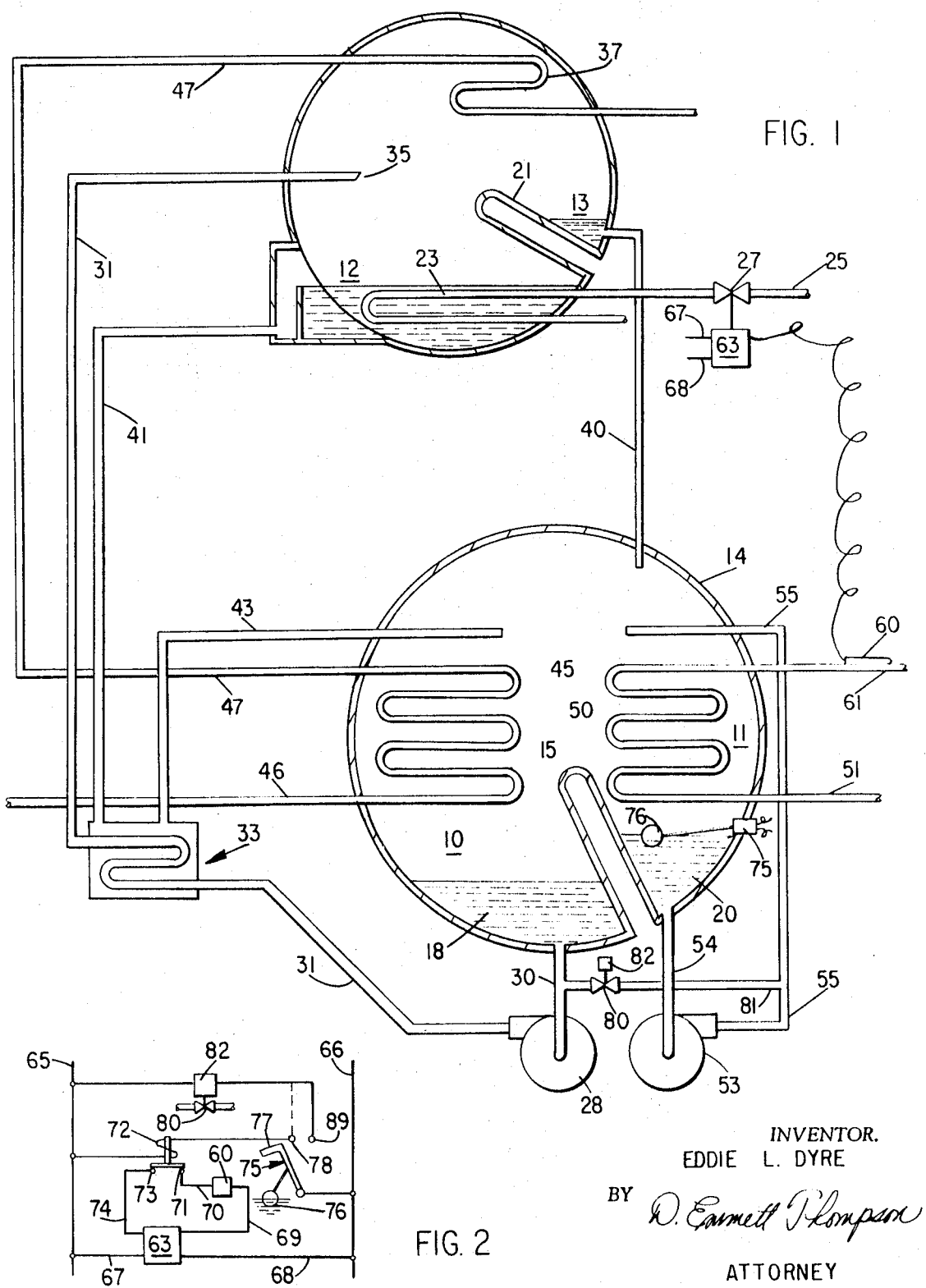
INVENTOR.
EDDIE L. DYRE
BY D. Earnett Thompson
ATTORNEY United States Patent Office 3,625,021
Patented Dec. 7, 1971

3,625,021
OVERLOAD CONTROL FOR ABSORBENT REFRIGERATION SYSTEM
Eddie L. Dyre, Syracuse, N.Y., assignor to
Carrier Corporation, Syracuse, N.Y.
Filed Jan. 2, 1970, Ser. No. 82
Int. Cl. F25b *15/06*
U.S. Cl. 62—148                                  2 Claims

ABSTRACT OF THE DISCLOSURE

An absorption refrigeration system includes an arrangement operable upon the absorbent solution approaching crystallization to render the chilled water sensor inoperable to modulate the heating medium supply valve when the demand load on the system exceeds the capacity of the system, as it is then operating, at the chilled water setpoint temperature, the object of said arrangement being to permit continued effective operation of the system in response to the excess demand load, with a concurrent elevation of the chilled water temperature above the setpoint of the chilled water sensor, and with minimum consumption of heating medium.

BACKGROUND OF THE INVENTION

In absorption refrigeration systems employing an absorbent salt solution and suitable refrigerant combination, such as lithium bromide and water, weak or relatively dilute absorbent solution is pumped from the absorber to the generator where it is heated by a heating medium such as steam or hot water to increase the concentration of the solution by removal of refrigerant therefrom. The refrigerant is returned to the evaporator to produce the desired refrigeration effect, and the stronger or relatively concentrated absorbent solution is returned to the absorber. The absorbent concentration required to produce the desired refrigeration effect depends upon the temperature of the chilled water leaving the machine, the absorbent concentration decreasing with increasing chilled water temperature.

The demand load on the machine is sensed by a load demand sensor, which senses the temperature of the chilled water leaving the machine. As the temperature of the chilled water increases above the setpoint of the sensor, the sensor and associated mechanism is effective to increase the supply of steam or hot water to the generator to increase the quantity of refrigerant being returned to the evaporator. Concurrently, the concentration of the absorbent solution being returned to the absorber increases. Conversely, if the sensed temperature is lower than the setpoint of the sensor, the supply of heating medium will be reduced. Conventionally, the heating medium is supplied to the generator by a valve modulated by the chilled water sensor in accordance with the sensed temperature. If all design factors exist, and the demand load on the machine does not exceed its design capacity, the sensor-valve control will maintain the chilled water temperature relatively close to the design setpoint. If, however, the temperature of the chilled water output continues above the setpoint, the concentration of the absorbent may rise to the crystallization concentration value with solidification of the absorbent rendering the machine inoperable.

Several arrangements are well known in the art which effectively limit absorbent concentration to avoid, or minimize, crystallization of the absorbent and solidification thereof. In one such arrangement, the dilution may be brought about by adding refrigerant in the pump circuit extending from the absorber to the generator.

The high chilled water temperature may result from the fact that the refrigeration load then imposed on the machine is simply in excess of the design capacity of the machine when operating with all design factors in order as, for example, if the refrigeration is employed for air conditioning and the ambient temperature rises to an abnormally high value. On the other hand, the high chilled water output temperature may result from a malfunctioning of the machine as, for example, the presence of noncondensables in the machine or an abnormal variation in the temperature of the condenser cooling water. Regardless of the cause, the heating medium supply valve will be moved toward open position, with the result that the absorbent in the absorber will move toward crystallization bringing into operation the arrangement for limiting concentration. However, the chilled water temperature will not be reduced whereby the sensor effects modulation of the heat supply valve toward further open position, resulting in further heat consumption but still effecting no drop in chilled water temperature. Accordingly, the additional heat supplied to the generator under this situation does not bring the chilled water temperature down to the design setpoint.

In other words, upon the heating medium supply valve being modulated to a position raising the concentration of the absorbent solution, but not lowering the chilled water temperature to the setpoint, it is a waste of heating medium to open the heat supply valve any further.

SUMMARY OF THE INVENTION

This invention has an an object an absorption refrigeration system which embodies an arrangement operable, in a situation as set forth above, with overconcentration of absorbent taking place, to remove the heat supply valve from the control of the chilled water sensor prior to or simultaneously with operation of the absorbent concentration limiting means, permitting the machine to so operate for the production of refrigeration regardless of the fact that the chilled water temperature is above the setpoint. By my invention, the machine continues to operate with an increase in chilled water temperature and actually effecting an increase in the production of refrigeration without waste of heat energy.

BRIEF DESCRIPTION OF THE DRAWINGS

FIG. 1 is a schematic diagram of an absorbent refrigeration system embodying my invention; and FIG. 2 is a schematic wiring diagram of an electrical control circuit.

DESCRIPTION OF THE PREFERRED EMBODIMENT

The system illutrated in FIG. 1 includes an absorber section 10, an evaporator section 11, a generator section 12, and a condenser section 13. The absorber and evaporator sections 10, 11 are encased in a common shell 14, the sections being partially separated by an inwardly extending baffle member 15 defining a sump 18 in the lower portion of the absorber section, and a sump 20 in the lower portion of the evaporator section.

The generator section 12 is partially separated from the condenser section 13 by an inwardly extending baffle 21. The generator section 12 is provided with a heat exchanger in the form of a coil 23 supplied with a heating medium, such as steam or hot water, from a line 25. Control valve 27 regulates the flow of the heating medium from the supply line 25 to the coil 23.

Weak absorbent solution is passed from the absorber sump 18 to the generator section by pump 28, the inlet side of which is connected to the sump 18 by a suction line 30. The output of the pump 28 is connected to a line 31 extending through a heat exchanger 33, the upper end of the line 31 terminating at 35 in the generator section.

The heat exchanging coil 23 serves to raise the temperature of the weak solution, driving the refrigerant therefrom. The refrigerant is condensed by a tube coil 37, through which cold water is circulated. The refrigerant collects in the lower portion of the condenser section 13 and is passed by line 40 into the upper portion of the evaporator section 11.

The enriched or concentrated absorbent solution, from which the refrigerant has been removed, is conducted from the generator section 12 through line 41, through heat exchanger 33 and line 43, and discharged into the upper portion of the absorber section 10 for discharge over heat exchanging coil 45 supplied with cold water from line 46. The output of the coil 45 is connected to the condenser coil 37 by line 47.

Water or other heat exchange fluid to be cooled is passed into heat exchanging coil 50 from line 51 and is cooled by the refrigerant discharged over the coil 50 by line 40, the refrigerant collecting in the sump 20. To effect proper heat exchange, a refrigerant pump 53 has an intake line 54 communicating with sump 20, and a discharge line 55 communicating with the evaporator section 20 above the coil 50 for the discharge of recirculated refrigerant over the coil.

A temperature sensor 60 is attached to the discharge line 61 from coil 50 in heat exchanging relation thereto. The heat supply control valve 27 is modulated toward on and off positions by actuating mechanism indicated by the rectangle 63. This mechanism may be supplied with power and controlled as by supply lines 65, 66, FIG. 2, through conductors 67, 68. One side of the sensor 60 is connected by wire 69 to the actuating mechanism 63, the other side of the sensor is connected by wire 70 to relay contact 71 of relay 72, and relay contact 73 is connected by wire 74 to the mechanism 63.

The actuating mechanism 63 of valve 27 causes valve 27 to move toward open position upon temperature rise sensed by sensor 60 in liquid line 61; that is, a temperature rise in the chilled water from coil 50 indicates that the system is not producing the output in compliance with the load imposed upon it. Accordingly, valve 27 is opened further by sensor 60 to provide a greater supply of heating medium to the generator coil 23, to boil off more refrigerant from the absorbent solution to provide more refrigeration. However, in view of the fact that under the stated situation the load demand on the machine exceeds its design capacity, or its then-operating capacity, providing more heat, producing more refrigerant, does not lower the chilled water temperature. On the other hand, it results in increasing the concentration of the absorbent returned from the generator to the absorber through lines 41, 43. If this action is permitted to persist, the absorbent may be driven into solidification.

With my invention, means is provided to prevent further modulation of the heat supply valve 27 by the sensor and mechanism 63. A switch 75 is mounted in the shell 14 contiguous to the sump 20. The switch is actuated by a float 76 positioned in the refrigerant in the sump 20. As the absorbent solution in the absorber 10 becomes more concentrated, the level of the solution in sump 18 becomes lower; and the level of the refrigerant in sump 20 rises. The float switch 75 is adjusted in such manner that the contact 77 of the switch 75 will be moved into engagement with contact 78 (FIG. 2), providing a circuit from supply line 66 to relay 72, the opposite side of which is connected to line 65. Upon energization of relay 72, the armature thereof will move out of bridging engagement with contacts 71, 73, deenergizing the mechanism 63 whereby further modulation of the valve 27 by the sensor 60 cannot be effected. Accordingly, the concentration of the absorbent solution in sump 18 will not increase further. To provide further assurance that the concentration of the absorbent will not increase, a dilution line 81 may be connected between lines 30 and 55 through valve 80 operated by a solenoid 82. In the event there is some further production of refrigerant in generator 12 with some additional concentration of the absorbent, the rising level of refrigerant in sump 20 will effect movement of contact 77 into engagement with contact 89 to effect energization of the solenoid 82 to open the dilution valve 80. The contact 77 is of sufficient length to simultaneously engage both of the contacts 78, 89. With this arrangement, overconcentration of the absorbent solution is prevented. Nevertheless, the machine will continue to produce refrigeration with the temperature of the chilled water in line 61 above the design setpoint of the sensor. The arrangement described accordingly permits continued operation of the machine without waste of heat energy supplied to the generator and without the likelihood of solidification of the absorbent solution.

Under operating conditions where the concentration of the absorbent varies only slowly, the situation may be taken care of by removing valve 27 from control of the sensor 60 by engagement of float switch contacts 77, 78. With the heat supply valve 27 so restrained against further opening movement, further increase in absorbent concentration is normally prevented. However, if an abnormal condition should further increase the concentration, effecting movement of contact 77 into engagement with contact 89, valve 80 will be open to transfer or divert refrigerant solution to the absorbent solution to promptly reduce concentration thereof and prevent solidification of the absorbent. It is apparent a separate float switch can be employed to control valve 80 in place of the dual contact switch 76.

I claim:
1. In an absorption refrigeration system having a generator section, a condenser section, an evaporator section, and an absorber section, said evaporator and absorber sections having sumps associated therewith for collection of refrigerant and absorbent liquid, said generator section including a heat exchanger, a heating medium supply line connected to said heat exchanger, a modulating heating medium supply valve connected in said supply line, a load demand sensor associated with said evaporator and operable to modulate said supply valve according to the refrigeration demand imposed on said system, an absorbent concentration sensing means operable in response to the level of liquid in one of said sumps corresponding to a predetermined concentration of the absorbent in said system to render said load demand sensor inoperable to modulate said heating medium supply valve to a further open condition.

2. An absorption refrigeration system according to claim 1 wherein said absorbent concentration sensing means includes a float-actuated switch located in said evaporator sump.

References Cited

UNITED STATES PATENTS

| 2,502,104 | 3/1950 | Reid, Jr. | 62—148 |
| 2,550,428 | 4/1951 | Reid, Jr. | 62—148 |
| 2,582,837 | 1/1952 | Leonard, Jr. | 62—148 X |
| 3,334,492 | 8/1967 | Leonard, Jr. | 62—148 |
| 3,426,547 | 2/1969 | Foster | 62—141 X |

WILLIAM F. O'DEA, Primary Examiner

P. D. FERGUSON, Assistant Examiner

U.S. Cl. X.R.

62—476